United States Patent Office 3,243,447
Patented Mar. 29, 1966

3,243,447
PREPARATION OF SPACIAL TETRAMERIC
ACYLOXY GROUP IV METAL OXIDES
Jacobus Rinse, 77 Anderson Road, Bernardsville, N.J.
No Drawing. Filed Oct. 31, 1960, Ser. No. 65,930
The portion of the term of the patent subsequent to
Apr. 30, 1980, has been disclaimed
2 Claims. (Cl. 260—414)

This application is a continuation-in-part of my copending application Serial No. 19,490 filed April 4, 1960, now matured into U.S. Patent No. 3,087,949.

This invention relates to the preparation of compounds which may be described as regular (or symmetrical) space tetrameric R-oxy metal oxides and acyloxy metal oxides, the metal being of Group IV of the Periodic table, and in particular, zirconium, tin, titanium and silicon.

Processes for the production of simple alkoxides and acylates of various metals and their linear polymers are described in the literature. To varying degrees, the compounds are unstable, for they unavoidably hydrolyze readily under ordinary conditions of use. This property renders these compounds of limited utility especially where water or moisture is present.

Space polymers definable as tetra R-oxy, tetrametal hexoxides (R being a hydrocarbon group) and tetra acyloxy, tetrametal hexoxides have been produced by the applicant and they have been found to possess good solubility in organic solvents and unique surface active properties. The tetrameric acylates are so stable at and slow to hydrolyze in water at high temperatures that they possess new properties rendering them of practical utility in several fields.

An object of the present invention is to provide methods of producing these space polymers which are practical in operation in employing easily available or producible raw materials, in using simple operations and in providing high yields without appreciable loss as by-products.

For producing the space tetrameric R-oxy metal oxides under one embodiment of the present invention, a metal alcoholate of a metal of Group IV of the Periodic table derived from an alcohol volatilizable from the reaction product is mixed and reacted with water in the mol ratio of substantially exactly 1:1.5. The application of heat to the reaction mass at a level which causes vaporization of the alcohol being liberated, as at 60° to 80° C., facilitates the initial and intermediate stages of the reaction, but liberation of alcohol ceases at these temperatures before the space tetrameric structure is attained. To produce these polymers, the reaction mass is heated at a temperature of 100° C., or somewhat more, and for producing some of the tetramers, the reaction is affected at a temperature of 130°–200° C. or higher to cause the reaction to go to completion. For reaching this completed stage, the heating is continued at the high level, generally for an hour or more, until three mols of alcohol have been liberated from the alcoholate and advantageously vaporized off, the removal being assisted by a vacuum, if required or desired. The product can be defined by the formula: $Me_4O_6(OR)_4$.

The metal alkoxides used in the production of the compounds of the instant invention are preferably derived from lower molecular alcohols. The alcohols must be of sufficiently high volatility that when their radicals are liberated and reform as alcohols in the process by reaction of the alkoxides with water, they may be removed by distillation. Alcohols of suitable volatility are propanol, butanol and pentanol and the corresponding iso-alcohols and secondary alcohols. Alkoxides of higher molecular alcohols or of mixtures of high and lower alcohols can be employed under some conditions, the alkoxides of higher alcohols having up to 10 carbon atoms being operable. In actual practice, alkoxides of isopropanol and butanol have the advantages of low cost and low boiling point.

The hereinbefore described reaction can be effectively carried out in the presence of an inert organic solvent for the reaction products during their formation, which additive may be a mutual solvent for the reactants.

The solvent serves to provide the required fluidity of the reactants, to moderate the speed of the reaction, to provide the desired uniformity of reaction and assist in the prevention of the formation of undesired products. Alcohols corresponding to alkoxides of the metal alcoholates used in the reaction can be advantageously employed. Any lower molecular alcohol can be used. Aromatic hydrocarbons such as toluene and xylene can be employed and they are preferably used in conjunction with lower molecular alcohols. Where the products are to be produced in segregated or powdered condition, it is necessary that the hydrocarbon as well as the lower molecular alcohol solvent be of sufficiently high volatility as will permit vaporization from the reaction mass.

Tetrameric metal oxide R-oxides where R is a hydrocarbon radical of a hydroxy hydrocarbon of too high volatility to permit production by the above described process can be produced by introducing at least one mol of the higher molecular hydroxy hydrocarbon along with one and one-half mols of water into the one mol of the metal alkoxide of the lower molecular alcohol and reacting under the same or substantially the same conditions. Here four mols instead of three mols of the lower alcohol are liberated.

Any hydroxy hydrocarbon of a higher boiling point than the alcohol corresponding to the alkoxide used can be employed. In addition to the aliphatic alcohols hereinbefore specifically referred to, there may be mentioned the aromatic hydroxides as phenol, the cresols and other alkylated phenols of 1–18 carbon atoms in the side chain, furfuryl and allyl alcohols and hydroxy hydrocarbons substituted with functional groups inactive in the process. There also may be mentioned high molecular aliphatic alcohols including those having up to 20 carbon atoms or more and they may be cyclic or straight chained, primary or secondary, unsubstituted or substituted with atoms or radicals inactive in the process, examples being lauryl, cetyl, stearyl, oleyl, linoleyl, hexyl, ethyl-hexyl and cyclohexyl alcohols.

In accordance with a second embodiment of the invention, the space tetrameric R-oxy, metal oxides hereinbefore described are produced from a tetrachloride or other tetrahalogenide of a metal of Group IV by mixing and reacting the metal chloride with water in the mol ratio of substantially 1:1.5 and with at least one mol of an hydroxy hydrocarbon, preferably a lower molecular alcohol, in the presence of a reagent which will take up and bind the hydrogen chloride liberated by the reaction.

The reaction can be efficiently carried out by slowly adding the water and the alcohol to the metal chloride in solution or dispersion form in an inert solvent such as one of the hydrocarbons hereinbefore mentioned, and during this addition, also introducing ammonia. The reaction to an intermediate stage proceeds with or without heat. Ammonium chloride precipitates as the reaction proceeds and upon completion of this step, the solid salt formed is preferably separated from the liquid reaction product. Thereupon the latter is heated to and at a temperature in excess of 100° C. until the condensation is complete, i.e., the space tetramer has been formed. This final heating is advantageously carried out under vacuum to remove excess or residual alcohol or any organic solvent used. Four mols of the chloride salt are formed for each mol of the metal chloride used.

Instead of ammonia, other hydrogen halide binders can be employed, such as triethyl amine or other organic amine, or less economically, sodium or potassium ethylate or other alcoholate. These liquid binders can be introduced into the reaction with the alcohol-water mixture. The amount of the acid binder used should be substantially equivalent to the chloride present. Any excess produces side reaction products in the reaction mass.

In an alternative procedure, the space tetrameric R-oxy, metal oxides may be formed by adding the metal chloride to cooled alcohol while simultaneously adding the ammonia or amine or other binding agent and subsequently adding the water in the stated quantity during continuation of the agitation. The precipitate formed is removed and the metal reaction product is heated, as before, at a temperature above 100° C. under vacuum until the condensation is complete. Again the product is an $Me_4O_6(OR)_4$.

In another important embodiment of the process of the invention, the procedures hereinbefore described are supplemented by a sequential reaction or a simultaneous reaction which produces space tetrameric acyloxy metal oxides. According to the first mentioned, the acyloxy compounds are produced from the tetrameric true metal oxide alkoxides of volatile alcohols hereinbefore described by adding a monohydric organic acid in the mol proportion of four of the acid to one of the alkoxide, to an inert organic solvent solution of the alkoxide and heating at the final temperature hereinbefore described, which liberates and vaporizes off four mols of alcohol per mol of the tetrameric metal oxide alkoxide treated.

The second and preferred process for producing the acyloxy compounds involves simultaneously introducing a mixture of the monobasic organic acid and water into the metal alkoxide hereinbefore defined in the mol proportions of 1:1.5:1, respectively. Again the reactants should be employed in solution form to provide the fluidity required for uniform reaction. Also the heating procedures and temperatures hereinbefore described are employed, the reacting and heating being continued until four mols of alcohol per mol of metal alkoxide used have been liberated and vaporized off. The reaction may be represented by the equation in which the HX is a monobasic organic acid and H is the replaceable hydrogen atom:

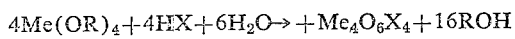
$$4Me(OR)_4 + 4HX + 6H_2O \rightarrow +Me_4O_6X_4 + 16ROH$$

The polymeric metal oxide acylates can also be produced by the reaction of the tetrachloride of the metal in solution with water and the acid in the mol ratio of 4:6:4 and with an alkyl amine or other hydrochloric acid binder in a quantity which will neutralize the acid, the reaction mass being heated to a temperature at which the polymer and an amine hydrochloride or other solid chloride salt form. The solvent is removed by vaporization, leaving the polymer.

The organic monovalent acids suitable for the process herein involved may be of any type. In a preferred embodiment they are aliphatic carboxylic acids, either saturated or unsaturated, aromatic, cycloaliphatic or heterocyclic acids or as well ester acids (half esters of dicarboxylic acids) and substituted acids where the substituent group is not active in the process, such as hydroxy acids and amino acids. Specific examples are lactic acid, citric acid, hydroxy acetic acid, hydroxy benzoic acid and hexahydro benzoic acid. The preferred class is the fatty acid group, from formic acid up through the long chain fatty acids such as stearic acid, oleic acid and behenic acid. Other operable acids include the various acids or acid mixtures of tall oil or other industrial or natural sources. Instead of a single acid, mixtures of two or more acids can be employed. A specific procedure involves first adding the acid to the metal chloride in solution or in suspension in a solvent, then adding the water, alcohol and ammonia (or amine) all in the defined mol proportions, removing the solid precipitate which forms and finally heating at the high temperature required for the formation of the space polymer.

Acid anhydrides corresponding to the acids hereinbefore described can also be employed, for during the reaction the anhydride ring opens up and one of the carboxyl groups becomes esterified by the alcohol liberated, thus providing, in effect, a monohydric acid for attaching to the metal component in the same manner as the monocarboxylic acid or the monoester of a dicarboxylic acid. Examples of dicarboxylic acid compounds are adipic, maleic and phthalic anhydrides.

The acylate producing processes of the invention are also applicable to organic acids other than carboxylic acids, e.g., sulfonic acids, as the raw material. The preferred class is aromatic sulfonic acids or alkyl aryl sulfonic acids such as dodecyl benzene sulfonic acid. The aryl radical may have more than one substituent group as in xylene sulfonic acids, and the group or groups may have from one to twenty-two or more carbon atoms.

Other acids or acid-acting compounds include the monoalkyl sulfonates (sulfates), of either saturated or unsaturated character, as sulfated fatty alcohols, sulfated monoethanol amines and amide sulfates, of 2 to 22 carbons in the hydrocarbon chain. Another type of acid suitable for the process is the partial ester of acids of phosphorous, more particularly, the monobasic esters, as the alkyl phosphoric acids or dialkyl hydrogen phosphates, in particular bis(ethyl-hexyl)monohydrogen phosphate.

The compounds produced by the processes of the present invention possess properties substantially different from the simpler metal alkoxide and acylate compounds described in the literature. The acylates have a considerably lower speed of hydrolysis and some of them do not hydrolyze at all under ordinary conditions of storage or use. The tetratitanium hex-oxy-tetra-stearate is so stable it can be emulsified in water and the water can be removed by boiling without causing hydrolysis.

The acylates have surface-active properties rendering them of general use as dispersing agents, emulsifiers, and as detergents. Some of the compounds are also useful for water-proofing and as driers for paints. Several of the alkoxide compounds, and particularly the zirconium oxide alkoxide compounds, are useful for the treatment of athletes foot and for the treatment of poison ivy. They hydrolyze slower than the monometal alkoxides and can be used for the preparation of very pure and fine-particle size metal hydroxides and polymeric metal oxide hydroxides which possess catalytic activity.

*Example 1*

Two hundred and eighty grams of stearic acid and 27 g. of water were dissolved in 100 g. of isopropyl alcohol and added to a solution of 327 g. of zirconium isopropoxide in 100 g. of xylene while the latter was being heated to 80° C. and agitated. The reaction was continued while raising the temperature finally to 220° C. under reduced pressure. The liberated isopropyl alcohol and that added as a solvent and as well the xylene was distilled off. The product obtained was a wax-like material having a melting point of 250° C. and a molecular weight of 1620 (calculated M.W. 1580). The yield was 385 g. The product was soluble in hexane and was found to possess excellent water-proofing properties for textiles.

*Example 2*

Three hundred and eight-three grams of zirconium normal butoxide was dissolved in 200 g. of hexane. Twenty-seven grams of water dissolved in 50 ml. of isopropyl alcohol was slowly added at 80° C. during vigorous agitation. The reaction was continued at 120° C. until no more butyl alcohol vaporized off. The product obtained was tetra-zirconium hexoxy tetrabutoxide. Yield 187 grams.

In the foregoing process, the zirconium normal butoxide may be replaced by equivalent amounts of titanium or tin alkoxides of other lower molecular alcohols, and corresponding products are obtained.

*Example 3*

Sixty grams of acetic acid and 27 g. of water after being dispersed in 100 g. of isopropyl alcohol were slowly added during agitation to 327 g. of zirconium isopropoxide dissolved in 100 g. of toluene, the reaction mass being heated to 100° C. When isopropyl alcohols ceased to vaporize off, the reaction was complete, the yield being 177 g. of a white powder soluble in benzene. It's determined zirconium content was 51.4%. The product was of the formula $Zr_4O_6(OOCCH_3)_4$. The theoretical zirconium content is 52.3%.

*Example 4*

Twenty-seven g. of water dissolved in 200 g. of isopropyl alcohol were added to 411 g. of tin tetra-butoxide theretofore dissolved in 200 g. of toluene. The mass was reacted at a temperature of 110° C. until the solvents and butyl alcohol liberated in the process ceased to vaporize off. Thereupon 280 g. of stearic acid was added and the temperature was raised to 190° C. and continued until the reaction was completed. The actual yield was 418 g. (calculated 422 g.) and the product was a wax having a molecular weight of 2030. (Calculated weight, 1688.)

In this process, equivalent quantities of the zirconium butoxide or the titanium butoxide can be substituted for the tin compound employed.

*Example 5*

Twenty-seven grams of water and 120 ml. of mixed alcohols, mostly primary amyl alcohol, together with 60 ml. of isopropyl alcohol were added to 208 g. of ethyl silicate, $Si(OC_2H_5)_4$, followed by the addition of 0.5 ml. of hydrogen chloride. The resulting mixture was refluxed for four hours after which the reaction was continued until the temperature reached 100° C., the volatile products being permitted to vaporize off. Next the reaction mass was heated under reflux for another 1.5 hours and thereupon the mass was heated at 160° C. under vacuum until the alcohol ceased to come off. The yield of the product was 137.5 g. (calculated 139 g.). It was a clear viscous liquid soluble in hydrocarbons and in alkyd resin solutions. The silicone content of the product was 19.9% which compares with the calculated silicone content of 20.1% contained in $Si_4O_6(OC_5H_{11})_4$. In this process, the amyl alcohol mixture can be replaced by equivalent amounts of phenol or of cyclohexanol.

*Example 6*

Twenty-seven g. of water and 280 g. of stearic acid in 360 cc. isopropanol were added to 284 g. of titanium isopropoxide dissolved in isopropyl alcohol, the mass being heated at 90° C. initially and finally at 170° C. until all the solvent present and the liberated alcohol was distilled off. The yield obtained was 354 g. of a wax-like solid soluble in hydrocarbon having a molecular weight of 1300. (Calc. mol. weight, 1404. After three days in storage, a new determination indicated a molecular weight of 2450. (Calc. for octamer; 2808 M.W.) Immediately thereafter, the temperature of the product in the naphthalene solution was raised to 150° C. After 30 minutes it was cooled to 80° C. and a new determination was made revealing a molecular weight of 1270 indicating reversion to the tetramer. After twenty-four hours another test revealed a molecular weight of 2500, indicating the octamer.

In the foregoing process the stearic acid can be replaced with equivalent amounts of other acids such as oleic, lauric, palmitic, benzoic and hexahydrobenzoic acids.

*Example 7*

Three hundred and sixteen grams of dodecyl benzene sulfonic acid and 27 g. of water in admixture with 100 g. of isopropyl alcohol were added to 284 g. of titanium isopropoxide previously dissolved in 100 g. of isopropyl alcohol. The mass was heated until the temperature reached 120° C. whereupon 100 g. of mineral oil (100 SUS) was added and the temperature raised to 150° C., vacuum being applied for a while to remove isopropyl alcohol. Thereupon 5 g. of water dissolved in 50 g. of isopropyl alcohol was added and the mass was again heated to 150° C. until no more alcohol vaporized off. The yield was 490 g. (calculated 488 g.) of $Ti_4O_6(C_{18}H_{29}O_3S)_4$. This product was resin-like and was soluble in mineral oil and revealed properties of a lubricating oil detergent. It lowers surface tension and brings about emulsification of water in oil.

*Example 8*

Nineteen g. of titanium tetrachloride are mixed with 100 g. of hexane. Then a solution of 28 g. of stearic acid and 10.1 g. of triethylamine in 50 g. of hexane is added slowly. Next a mixture of 22.2 g. of butanol with 30.3 g. of triethylamine is added slowly. The temperature is raised to 60° C. and the precipitate of triethylamine hydrochloride is filtered off. Then 2.7 g. of water mixed with 25 g. of isopropanol are added. Two hundred g. of toluene are added and hexane is removed by distillation. The temperature is raised to 150° C. and the toluene is removed, finally under vacuum. The yield is 34 g. of tetrameric titanium oxide stearate, a wax-like material (M.P. 40° C.) of great stability and with a molecular weight of 1300 determined by lowering of the freezing point of naphthalene.

After this product has been stored overnight, its molecular weight was ascertained as having about doubled (2450) indicating that the octamer had formed.

*Example 9*

One hundred seventy grams of silicon tetrachloride is added to 500 g. of isopropanol maintained at 0° C. under agitation. Simultaneously a stream of dry ammonia vapor is introduced into the reaction mass, thereby taking up the liberated hydrochloric acid. Excess ammonia is avoided to prevent side reactions. The mixture is kept slightly acidic. When all silicon chloride has been added, the temperature is raised to 30° C. and the ammonium chloride formed is removed by filtration. Next, 27 g. of water diluted with 100 g. isopropanol is added and the batch is heated under reflux for 5 hours. Then isopropanol is removed by distillation, finally at 150° C. under vacuum. The yield obtained is 110 gr. of a clear liquid consisting of $Si_4O_6(OC_3H_7)_4$.

Additional metals of Group IV, the alkoxides of which may be used in the practice of the present invention, include hafnium, germanium, cerium, lead, thorium, uranium and other tetravalent rare earth metals.

Instead of employing a metal alkoxide of a single alcohol, a mixed alkoxide may be used as a starting material, as zirconium tri-isopropoxide, mono-ethoxide. Also, instead of using water to supply the oxygen atoms for joining the metal atoms in the space tetramers produced from the metal chlorides, sodium or other alkali metal hydroxide can be employed (in an amount equivalent to the water replaced) with either complete or a partial elimination of the use of the hydrogen chloride binder. The reaction of the metal chloride, sodium hydroxide and alcohol in the mol ratio of 4:6:4 leads to the tetrametal, hexoxy tetralkoxide, sodium chloride and hydrogen chloride in the mol ratio of 1:6:10. Thus the sodium hydroxide, like the water, supplies the oxygen and at the same time takes up part of the chlorine liberated from the metal chloride atoms.

The molecules of the space tetramers, or at least some of them, produced by the present invention have a tendency on aging to associate and form weakly bound octamers or higher polymers, which polymers, however, break down to tetramers again on heating to a high temperature or to their temperature of initial production.

It should be understood that the present invention is not limited to the details herein set out, but that it extends to all similar raw materials, procedures and conditions which will occur to those skilled in the art upon consideration of the general tenor of the specification and the scope of the claims appended hereto.

I claim:
1. Process for the preparation of spacial tetrameric acyl-oxy metal oxides wherein the metal is of Group IV, which comprises, mixing and reacting an Me(alcoholate)$_4$ where Me is a metal of Group IV, the alcohol of which is volatilizable from the metal product formed, with water in the mol ratio of substantially exactly 1:1.5 at a final temperature as high as 100° C. until three mols of alcohol per mol of the metal compound have been liberated by the reaction and vaporized off, adding a monohydric organic acid of not more than 22 carbon atoms and having the acid radical as the only functional group to the tetra R-oxy, tetra-metal hexoxide formed, in the mol ratio of 4:1, heating and reacting the mixture in the presence of an inert solvent at a temperature as high as 100° C. until four mols of alcohol per mol of said hexoxide have been liberated and vaporized off, thereby forming a spacial tetrameric acyloxy metal oxide having one and only one acyl radical attached to each metal atom.

2. A process for the preparation of space polymers of acyl-oxy metal oxides wherein the metal is a metal of Group IV of the periodic system and one and only one acyl radical is attached to each metal atom where Me is a metal or Group IV, which comprises mixing and reacting a Me(alcoholate)$_4$, the alcohol of which is volatilizable from the metal product formed, with water in the mol ratio of substantially exactly 1:1.5 and with a monohydric organic acid of not more than 22 carbon atoms having the acid radical as the only functional group having a higher boiling point than said alcohol at a final temperature as high as 100° C. until 4 mols of alcohol per mol of Me(alcoholate)$_4$ have been liberated and volatilized off, thereby forming a space polymer having one and only one acyl radical attached to each metal atom.

References Cited by the Examiner

UNITED STATES PATENTS

| | | | |
|---|---|---|---|
| 2,621,195 | 12/1952 | Haslam | 260—429.5 |
| 2,666,722 | 1/1954 | Boyd | 260—429.5 |
| 2,689,858 | 9/1954 | Boyd | 260—429.5 |
| 2,708,203 | 5/1955 | Haslam | 260—429.5 |
| 3,087,949 | 4/1963 | Rinse | 260—429.5 |

TOBIAS E. LEVOW, *Primary Examiner.*

W. J. VANBALEN, H. M. S. SNEED,
*Assistant Examiners.*